United States Patent
Ubukata et al.

(10) Patent No.: US 7,387,441 B2
(45) Date of Patent: Jun. 17, 2008

(54) LINEAR GUIDE BEARING APPARATUS

(75) Inventors: Hiromasa Ubukata, Saitama (JP); Yasushi Abe, Saitama (JP)

(73) Assignee: NSK Ltd., Tokyo (JP)

(*) Notice: Subject to any disclaimer, the term of this patent is extended or adjusted under 35 U.S.C. 154(b) by 217 days.

(21) Appl. No.: 11/197,518

(22) Filed: Aug. 5, 2005

(65) Prior Publication Data
US 2006/0029303 A1    Feb. 9, 2006

(30) Foreign Application Priority Data

Aug. 5, 2004  (JP) ............. P. 2004-229604
Aug. 23, 2004 (JP) ............. P. 2004-242489

(51) Int. Cl.
*F16C 29/06* (2006.01)
(52) U.S. Cl. ................. 384/13; 384/45
(58) Field of Classification Search ........... 384/13, 384/15, 45
See application file for complete search history.

(56) References Cited

U.S. PATENT DOCUMENTS

| 5,769,543 A * | 6/1998 | Tsukada et al. ............ 384/15 |
| 5,967,667 A * | 10/1999 | Yatsu ........................ 384/13 |
| 6,082,899 A * | 7/2000 | Suzuki et al. .............. 384/13 |
| 6,119,813 A | 9/2000 | Yabe et al. |
| 6,155,717 A | 12/2000 | Michioka et al. |
| 6,176,617 B1 * | 1/2001 | Kamimura et al. .......... 384/13 |
| 6,401,867 B1 * | 6/2002 | Michioka et al. ........... 384/13 |
| 6,435,718 B1 * | 8/2002 | Weiss et al. ............... 384/13 |
| 6,517,244 B2 * | 2/2003 | Ishihara .................... 384/13 |

FOREIGN PATENT DOCUMENTS

| DE | 10026587 A1 | 12/2000 |
| DE | 10243871 A1 | 4/2003 |
| EP | 1005953 A2 | 6/2000 |

OTHER PUBLICATIONS

German Office Action for DE 10 2005 037 046 dated Aug. 29, 2006.

* cited by examiner

*Primary Examiner*—Thomas R. Hannon
(74) *Attorney, Agent, or Firm*—Sughrue Mion, PLLC

(57) ABSTRACT

In a linear guide bearing apparatus in which a lubricant feeding member 20 attached to an axial end of a slider 2 and making sliding contact with the rolling body rolling grooves 3 of a guide rail 1 to feed a lubricant thereto is of a porous material containing the lubricant and is pressed outwardly along the width of the slider 2 by a pressing member 31 fitted in the lubricant feeding member 20 at an upper portion thereof to have its sliding contact portions 21 pressed against the rolling body rolling grooves 3 of the guide rail 1, the lubricant feeding member 20 is housed in the casing 30 formed integrally with the pressing member 31.

11 Claims, 7 Drawing Sheets

LINEAR GUIDE BEARING APPARATUS

The present invention claims foreign priority to Japanese patent application no. P.2004-229604, filed on Aug. 5, 2004 and no. P.2004-242489, filed on Aug. 23, 2004, the contents of which are incorporated herein by references.

BACKGROUND OF THE INVENTION

1. Field of the Invention

The present invention relates to a linear guide bearing apparatus used in any of various kinds of machines and apparatus, such as a machine tool, robot or measuring instrument.

2. Description of the Background Art

A known linear guide bearing apparatus of this type is shown in, for example, FIG. 12. This linear guide bearing apparatus has an axially extending guide rail 1 and a slider 2 mounted about the guide rail 1 axially movably relative to the guide rail 1.

The guide rail 1 has an axially extending rolling body rolling groove 3 formed in each of two sidewalls thereof. The slider 2 has a rolling body rolling groove 7 formed in the inner surface of each of two legs 4 of a main slider part 2A and facing one of the rolling body rolling grooves 3. A multiplicity of balls B as examples of rolling bodies are placed rollably between the rolling body rolling grooves 3 and 7 facing each other so that the slider 2 may be axially movable on the guide rail 1 relative to it by the rolling of the balls B.

As the slider 2 moves such that, the balls B between the guide rail 1 and the slider 2 roll toward an end of the slider 2. In this situation, in order to continue the axial movement of the slider, there is required a infinite circulation of the balls B.

Therefore, a rolling body passage 8 is so formed as to extend axially through each legs 4 of the main slider part 2A and a substantially U-shaped end cap 5 is secured to each end of the main slider part 2A by a securing member, such as a screw 12, and has a semi-circular curved turning passage 6 connecting the rolling body rolling grooves 3 and 7 and the rolling body passage 8 to thereby form a rolling body infinite circulation raceway.

A lubricant feeding member 15 for feeding a lubricant to the rolling body rolling groove 3 of the guide rail 1 in sliding contact therewith is situated on the outer surface of each end cap 5 and secured to the end of the main slider part 2A with the end cap 5 by e.g. the screw 12.

The lubricant feeding member 15 is of e.g. a porous resin containing the lubricant, has a substantially U-shaped form like the end cap 5 and has a fixing ring 16 fitted in the outer surface of each of its U-shaped end portions to have the screw 12 pass therethrough and a sliding contact portion 17 projecting from the inner surface of each of its U-shaped end portions to make sliding contact with the adjacent rolling body rolling groove 3 of the guide rail 1 to feed the lubricant thereto, as shown in FIG. 13.

The lubricant feeding member 15 has a recess 19 formed approximately in the center of an upper side thereof so that a ring-like shaped pressing member 18 is adopted to be fitted therein. When the pressing member 18 is fitted in the recess 19 and exerts pressure on the top portion of the lubricant feeding member 15 to deform it outwardly along the width of the slider 2, the U-shaped end portions of the lubricant feeding member 15 situated toward its bottom may be deformed inwardly along the width of the slider 2 so that the sliding contact portions 17 presses against the rolling body rolling grooves 3 of the guide rail 1.

In FIG. 12, each symbol 11 denotes a side seal attached to the outer surface of the lubricant feeding member 15 and secured to the end surface of the main slider part 2A with the lubricant feeding member 15 and the end cap 5 via the screws 12. A symbol 10 denotes a tapped hole formed in the end surface of the main slider part 2A for each screw 12, a symbol 13 denotes a grease nipple, and a symbol 14 denotes a hole for inserting each bolt for securing the guide rail 1.

According to the known linear guide bearing apparatus as described, since the thickness A of the pressing member 18 and the fixing ring 16 are larger than the thickness B of the lubricant feeding member 15 (see FIG. 14), in a case that a plurality of lubricant feeding members 15 are put together as shown in FIG. 15, a clearance C is formed between every two adjoining lubricant feeding members 15 and are undesirably likely to allow fine dust, etc to enter the slider 2 therethrough.

Moreover, as the lubricant feeding member 15 is open to its outside and has an exposed outer periphery, there have been occurred undesirably problems that the lubricant on its outer periphery may easily be deteriorated or vaporize, and that the lubricant may not be fed to the rolling body rolling grooves 3 efficiently, and the lubricant may be lost or deteriorated in an accelerated way under the influence of any coolant, organic solvent, etc used when the apparatus is in operation.

Moreover, since the pressing member 18 and the fixing ring 16 for the lubricant feeding member 15 are made of steel or a resin, it is undesirably likely that the pressing member 18 and the fixing ring 16 may be deteriorated by chemicals, coolant, etc. Further, for each one of the lubricant feeding member 15, one pressing member 18 and one fixing ring 16 are required, which lead to increase number of parts, and make complicate to assemble the apparatus.

Further, according to the known linear guide bearing apparatus as described, the side seals 11 sealing the ends of the slider 2 are rubber seals and present difficulty in the complete removal of finely divided foreign matter. Moreover, the heat generated by sliding friction between the side seals 11 and the guide rail 1 and the sliding wear of their lips lower their sealing performance and disable them to exhibit any satisfactory dust-proofing result.

SUMMARY OF THE INVENTION

The present invention has been made to overcome such inconveniences and it is one of objects thereof to provide a linear guide bearing apparatus which makes it possible to prevent fine dust, etc. from entering a slider through between any two adjoining lubricant feeding members when a plurality of lubricant feeding members are put together, which makes it possible to prevent any lubricant from being deteriorated or vaporizing easily from the outer periphery of the lubricant feeding member and feed the lubricant efficiently to the rolling body rolling grooves of a guide rail, which makes it possible to prevent the loss of the lubricant from the lubricant feeding member, the deterioration of the lubricant and the deterioration of a pressing member, etc., and which requires only a small number of parts, including the pressing member, and is easy to assemble.

In order to achieve the above object, according to a first aspect of the present invention, there is provided a linear guide bearing apparatus, comprising:

a guide rail having an axially extending rolling body rolling groove;

a slider having a rolling body rolling groove facing the rolling body rolling groove of the guide rail and mounted about the guide rail axially movably relative to the guide rail by rolling of pluralities of rolling bodies disposed between the rolling body rolling grooves;

a lubricant feeding member made of a porous material which contains a lubricant, and feeding the lubricant to the rolling body rolling groove of the guide rail;

a pressing member fitted to an upper portion of the lubricant feeding member to exert pressure on the lubricant feeding member outwardly along a width direction of the slider so as to press a sliding contacting portion of the lubricant feeding member to the rolling body rolling groove of the guide rail; and a casing formed integrally with the pressing member and housing the lubricant feeding member therein.

According to a second aspect of the present invention, there is provided a linear guide bearing apparatus, comprising:

a guide rail having an axially extending rolling body rolling groove;

a slider having a rolling body rolling groove facing the rolling body rolling groove of the guide rail and mounted about the guide rail axially movably relative to the guide rail by rolling of pluralities of rolling bodies disposed between the rolling body rolling grooves; and pluralities of sealing members attached to each axial end of the slider and making sliding contact with the guide rail to seal the axial end of the slider, wherein the plurality of the sealing members, which are made of porous felt material, are arranged in an axial direction of the slider, and at least two sealing member differ in density from each other.

According to a third aspect of the present invention, as set forth in the second aspect of the present invention, it is preferable that the sealing member is impregnated with a lubricant.

According to a fourth aspect of the present invention, as set forth in the first aspect of the present invention, it is preferable that the lubricant feeding member including pluralities of sealing members, which are made of porous felt material and arranged in an axial direction of the slider, and at least two sealing member differ in density from each other.

According to a fifth aspect of the present invention, as set forth in the first aspect of the present invention, it is preferable that the pressing member is substantially ring shape.

According to a sixth aspect of the present invention, as set forth in the first aspect of the present invention, it is preferable that the pressing member is substantially polygonal shape, the pressing member protrudes from the casing to the slider while a width of the pressing member reduces toward to a protruding direction.

According to a seventh aspect of the present invention, as set forth in the sixth aspect of the present invention, it is preferable that the pressing member is substantially trapezoidal shape.

According to an eighth aspect of the present invention, as set forth in the first aspect of the present invention, it is preferable that the casing has a pressing portion formed on an inner surface thereof so as to press the sliding contacting portion to the rolling body rolling groove of the slider.

According to a ninth aspect of the present invention, as set forth in the eighth aspect of the present invention, it is preferable that the pressing portion is formed in substantially flat shape.

According to a tenth aspect of the present invention, as set forth in the eighth aspect of the present invention, it is preferable that the pressing portion is in substantially arc shape.

According to an eleventh aspect of the present invention, as set forth in the eighth aspect of the present invention, it is preferable that the pressing portion protrudes from the casing to the lubricant feeding member while a width of the pressing portion reduces toward to a protruding direction.

According to a twelfth aspect of the present invention, as set forth in the eighth aspect of the present invention, it is preferable that the pressing portion is plate spring.

As the lubricant feeding member is housed in the casing formed integrally with the pressing member and is covered with the casing, the present invention makes it possible to prevent fine dust, etc. from entering the slider through between any two adjoining lubricant feeding members when a plurality of lubricant feeding members are put together. Accordingly, it possible to prevent any lubricant from being deteriorated or vaporizing easily from the outer periphery of the lubricant feeding member and feed the lubricant efficiently to the rolling body rolling grooves of the guide rail, which makes it possible to prevent the loss of the lubricant from the lubricant feeding member and the deterioration of the lubricant under the influence of any coolant, organic solvent, etc., the deterioration of the pressing member, etc. and the deterioration of the lubricant feeding member by ultraviolet radiation, etc.

Further, the pressing member is formed integral with the casing, the numbers of parts can be reduced and simplify in assembling. Furthermore, when the pressing member is formed as an integral mold product, which is integrally mold with the casing, dimensions of the pressing member can be stabilized.

As the sealing members sealing the axial ends of the slider are formed from a porous felt material, the invention according to the second aspect makes it possible to remove finely divided foreign matter and dust effectively and lower a force of friction acting between the sealing members and the guide rail to suppress the heat generated by their sliding friction and the sliding wear of their lips and thereby improve their sealing performance and realize an outstanding dust-proofing result.

As the sealing member is composed of a plurality of sheets arranged axially of the slider and at least two of them differ in density from each other, the sealing member is of relatively high strength and high density and can remove even foreign matter of high hardness effectively.

The invention according to the third aspect exhibits a lubricating result owing to the impregnation of the sealing members with the lubricant in addition to the dust-proofing result of the invention according to the second aspect, and makes it possible to achieve any lubricating performance depending on the use of the device by employing sealing members of different density, since a sealing member of high density achieves a high lubricant feeding rate, while a sealing member of lower density gives a lower lubricant feeding rate.

DETAILED DESCRIPTION OF THE PREFERRED EMBODIMENTS

Figure 1:
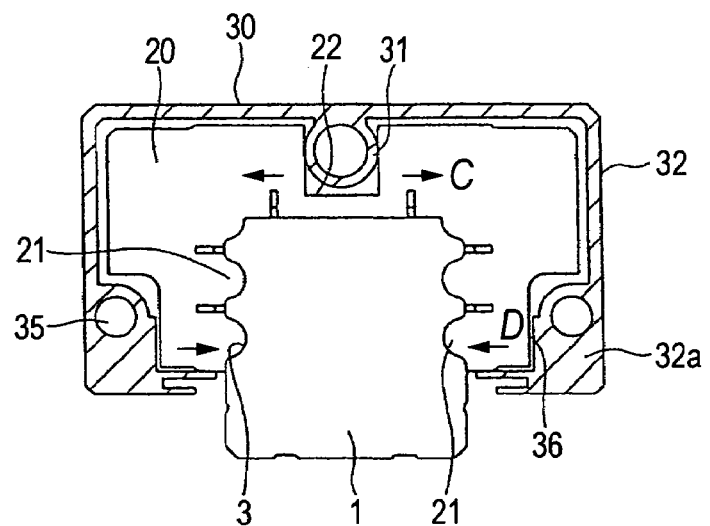
FIG. 1 is a sectional view for explaining a linear guide bearing apparatus according to an embodiment of the present invention.
Figure 2:
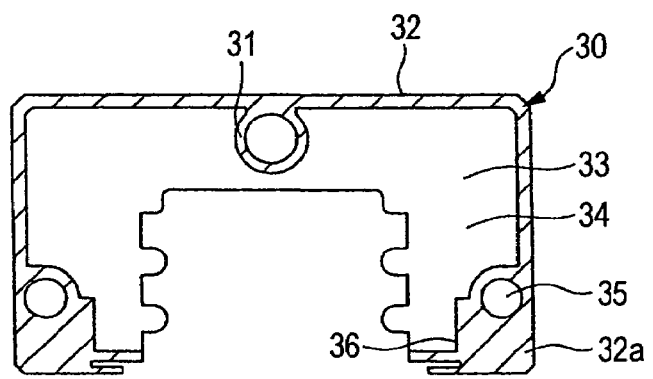
FIG. 2 is a sectional view showing a casing.
Figure 3:
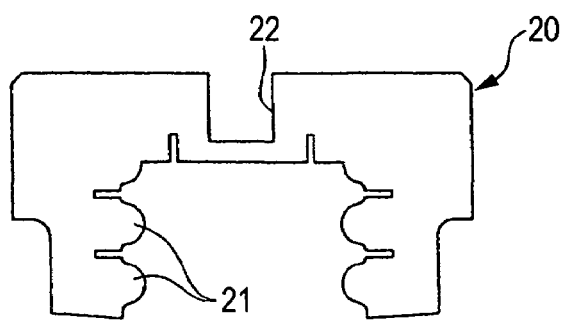
FIG. 3 is a diagram showing a lubricant feeding member.
Figure 4:
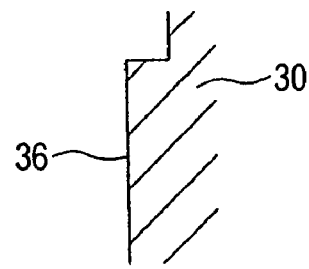
FIG. 4 is a sectional view showing the shape of a portion in which the sliding contact portion of the lubricant feeding member is pressed against the rolling body rolling grooves of the guide rail.
Figure 5:
FIG. 5 is a sectional view showing a modified embodiment of the pressing member.
Figure 12:
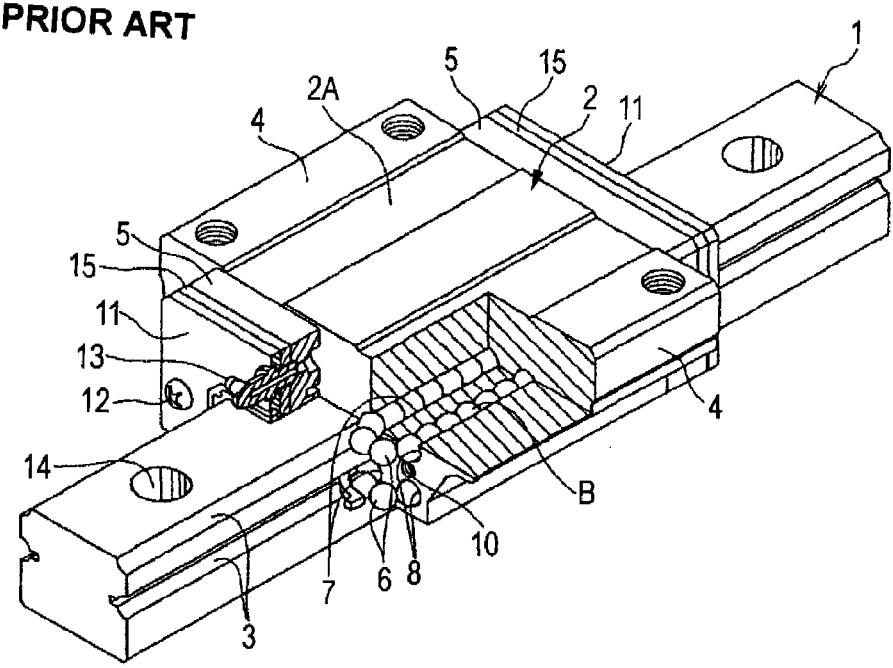
FIG. 12 is a partly cut-away perspective view for explaining a known linear guide bearing apparatus.
Figure 13:
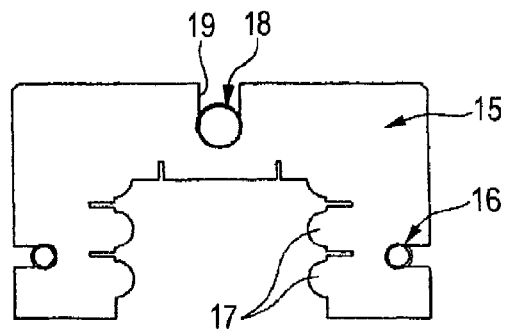
FIG. 13 is a diagram for explaining a known lubricant feeding member.
Figure 14:
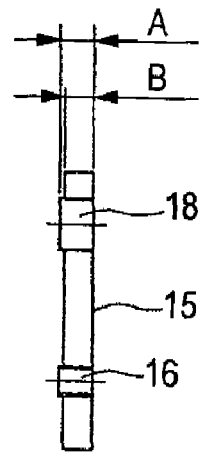
FIG. 14 is a side elevational view of FIG. 13.
Figure 15:
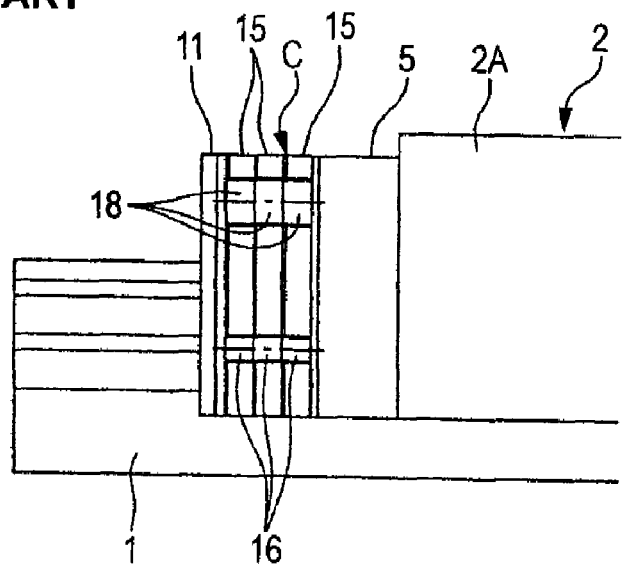
FIG. 15 is a diagram showing a plurality of known lubricant feeding members as attached to the end of the slider.

A first embodiment of the present invention will now be described with reference to drawings. FIG. 1 is a sectional view for explaining a linear guide bearing apparatus according to an embodiment of the present invention. FIG. 2 is a sectional view showing a casing. FIG. 3 is a diagram showing a lubricant feeding member. FIG. 4 is a sectional view showing the shape of a portion in which the sliding contact portion of the lubricant feeding member is pressed against the rolling body rolling grooves of the guide rail. FIG. 5 is a sectional view showing a modified embodiment of pressing member. FIGS. 6 to 9 are each a sectional view showing modified embodiments of the portion in which the sliding contact portion of the lubricant feeding member is pressed against the rolling body rolling grooves of the guide rail. Those parts which the device embodying the present invention shares with the known linear guide bearing apparatus as described with reference to FIG. 12 are denoted by the same symbols throughout the drawings and no repeated description thereof will be made.

In the linear guide bearing apparatus according to the first embodiment according to a first aspect of the present invention, a lubricant feeding member 20 attached to an axial end of a slider 2 and making sliding contact with the rolling body rolling grooves 3 of a guide rail 1 for feeding a lubricant thereto is housed in a casing 30 formed integrally with a pressing member 31, as shown in FIG. 1.

The lubricant feeding member 20 is of e.g. a porous resin containing the lubricant, has a substantially U-shaped form, which is somewhat smaller than the end cap 5, and has a sliding contacting portion 21 projecting fron the inner surface of each of U-shaped end portions to make sliding contact with the adjacent rolling body rolling groove 3 of the guide rail 1 to feed the lubricant thereto, as shown in FIG. 3, The lubricant feeding member 20 has a recess 22 formed approximately in the center of an upper portion thereof so that an annular pressing member 31 fitted therein.

The casing 30 is an integrally molded product of e.g. a resin or steel. The casing 30 is formed substantially U-shaped as well as the end cap 5 and substantially the same size with the end cap 5. A housing portion 34 is provided with the casing 30 for housing the lubricant feeding member 20, the housing portion 34 is formed by an outer peripheral wall 32 covering the outer periphery of the lubricant feeding member 20 and an end wall 33 covering an axial end surface of the lubricant feeding member 20, as shown in FIG. 2.

The casing 30 has a screw insertion hole 35 formed in the outer peripheral wall of each of its U-shaped end portions so that a screw 20 is inserted therethrough. The casing 30 further has the annular pressing member 31 formed as an integral part therewith approximately in the center of an upper portion of the housing portion 34 and adapted to be fitted in the recess 22 of the lubricant feeding member 20.

When housing the lubricant feeding member 20 in the housing portion 34 of the casing 30 and making the recess 22 of the lubricant feeding member forcibly fit to the pressing member 31 of the casing so as to press and deform outwardly along the width of the slider (in a direction of arrows C in FIG. 1), the U-shaped end portions of the lubricant feeding member 20 positioned lower side thereof are deformed inwardly along the width of the slider 2 (in a directions of arrows D in FIG. 1) so that the sliding contact portions 21 is pressed against the rolling body rolling grooves 3 of the guide rail 1 effectively.

According to the embodiment, the casing 30 has a pressing portion 36 formed on the inner surface of each of its U-shaped outer end walls 32a for pressing the adjacent sliding contacting portion 21 of the lubricant feeding member 20 against the rolling body rolling groove 3 of the guide rail 1 effectively, as shown in FIG. 4.

As described above, the lubricant feeding member 20 is housed in the casing 30 formed integrally with the pressing member 31 and is covered with the casing 30. The aforementioned embodiment makes it possible to prevent fine dust, etc. from entering the slider 2 through between any two adjoining lubricant feeding members 20 when a plurality of lubricant feeding members 20 are put together. Also, the embodiment makes it possible to prevent any lubricant from being deteriorated or vaporizing easily from the outer periphery of the lubricant feeding member 20 and therefore, it makes possible to feed the lubricant efficiently to the rolling body rolling grooves 3 of the guide rail 1. Furthermore, according to the embodiment, it makes possible to prevent effectively the loss of the lubricant from the lubricant feeding member 20 and the deterioration of the lubricant, which are caused by an effect of the coolant or an organic solvent, and also to prevent effectively the deterioration of the pressing member 31 or the deterioration of the lubricant feeding member 20 caused by ultraviolet radiation etc.

The formation of the pressing member 31 as an integral portion of the casing 30 enables a reduction in the number of parts and thereby a simplify in assembling and the pressing member 31 formed as an integral portion of the casing 30 is stabilized in dimensions of the pressing member 31.

It is to be understood that the present invention is not limited to the mode of carrying it out as described above, but that variations or modifications may be made without departing from the scope and spirit of the present invention.

For example, while according to the mode described above, the pressing member 31 has been shown as having a ring-like shape, it is not limited thereto. The pressing member 31 may alternatively have a trapezoidal, as shown in FIG. 5.

Figure 6:
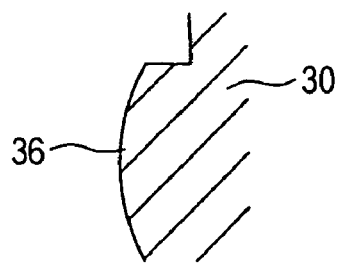
FIG. 6 is a sectional view showing a modified embodiment of the portion in which the sliding contact portion of the lubricant feeding member is pressed against the rolling body rolling grooves of the guide rail.
Figure 7:
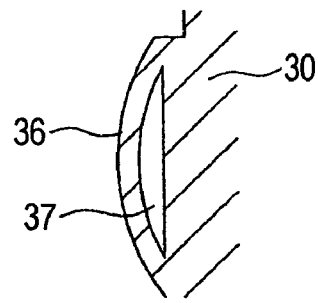
FIG. 7 is a sectional view showing another modified embodiment of the portion in which the sliding contact portion of the lubricant feeding member is pressed against the rolling body rolling grooves of the guide rail.
Figure 8:
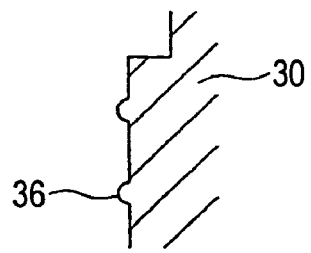
FIG. 8 is a sectional view showing still another modified embodiment of the portion in which the sliding contact portion of the lubricant feeding member is pressed against the rolling body rolling grooves of the guide rail.
Figure 9:
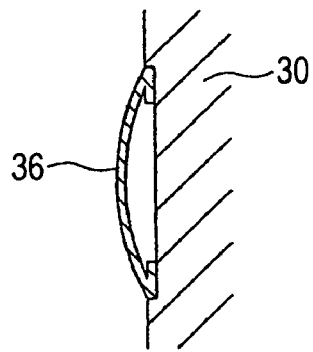
FIG. 9 is a sectional view showing still another modified embodiment of the portion in which the sliding contact portion of the lubricant feeding member is pressed against the rolling body rolling grooves of the guide rail.

While according to the mode described above, the pressing portion 36 has been shown as having a flat surface, it may be replaced by a pressing portion 36 having an arc shape or otherwise protruding shape or having an internal slit 37 so as to become an elasticity, as shown in FIGS. 6 to 8, or a pressing portion 36 formed from e.g. a plate spring separately from the casing 30 as shown in FIG. 9.

Figure 10:
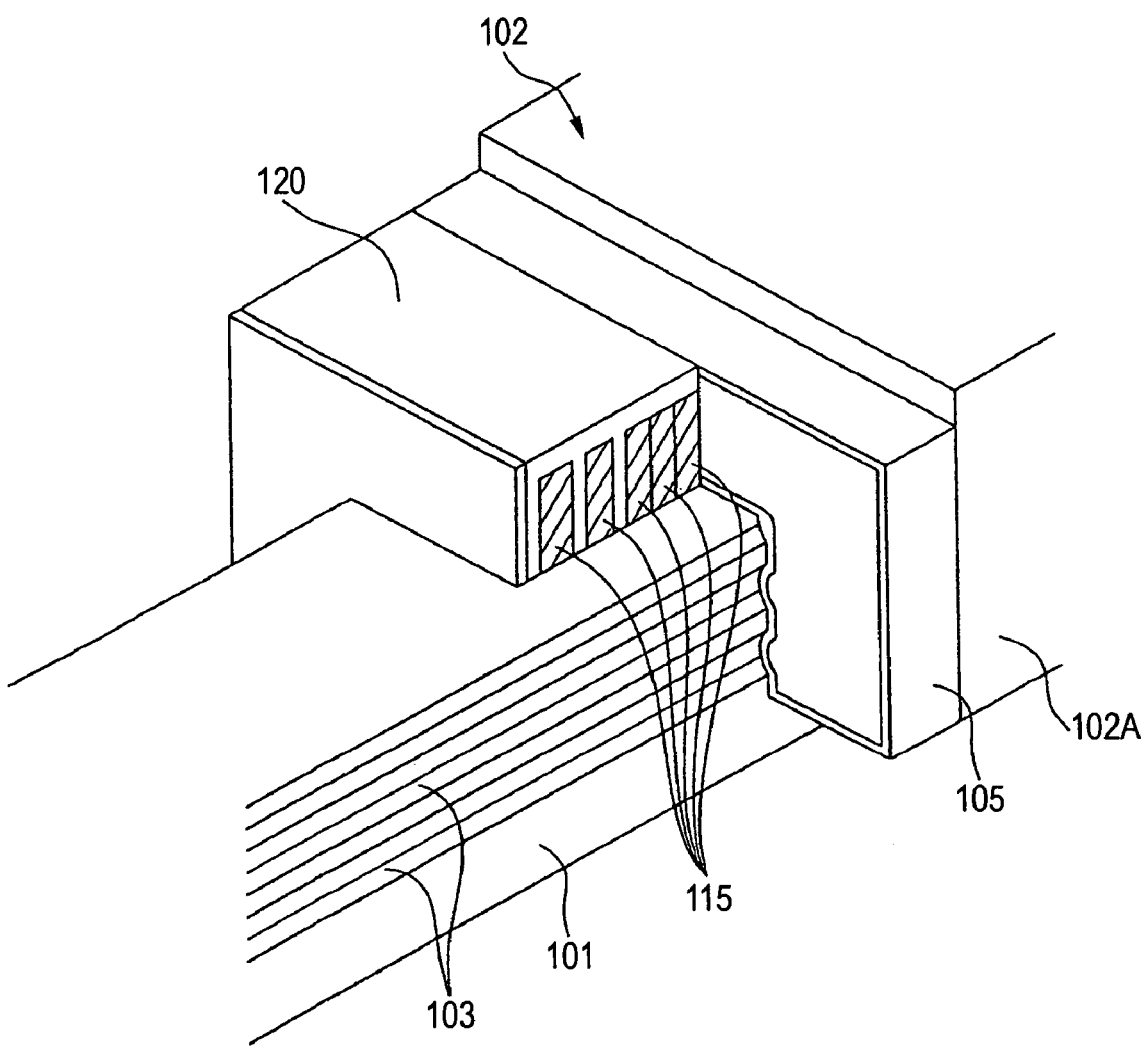
FIG. 10 is a perspective view, partly in section, for explaining an example of a main part of the linear guide bearing apparatus according to a second embodiment of the present invention.
Figure 11:
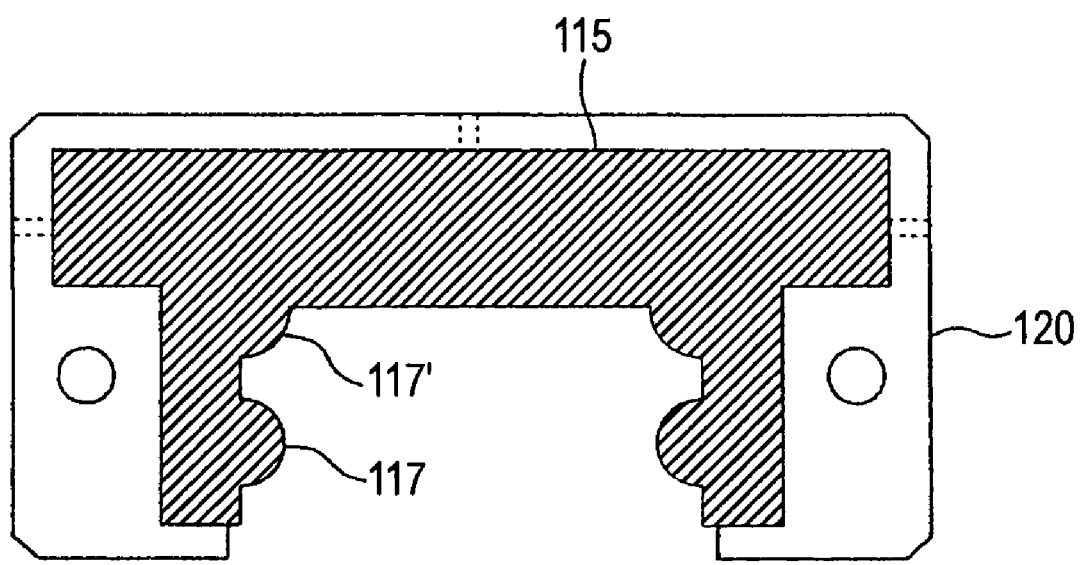
FIG. 11 is a diagram showing an example of a sealing member according to the second embodiment.

A second embodiment according to the second aspect of the present invention will now be described with reference to drawings. FIG. 10 is a perspective view, partly in section, for explaining the essential part of a linear guide bearing apparatus according to the embodiment of the present invention and FIG. 11 is a diagram showing one form of a sealing member.

In the linear guide bearing apparatus according to the embodiment of the present invention, a sealing member 115 making sliding contact with the rolling body rolling grooves 103 of a guide rail 101 and sealing each axial end of a slider 102 is composed of a plurality of sheets arranged axially of the slider 102 and housed in a casing 20 on the outside of an end cap 105, as shown in FIG. 10.

The sealing member 115 is formed from a porous felt material composed of e.g. synthetic resin fibers and containing a lubricant, such as lubricant oil or grease. The sealing member 115 has a substantially U-shaped form as well as the end cap 105. The sealing member also has a sliding contact portion 117 projecting from the inner surface of each of its U-shaped end portions to make sliding contact with the adjacent rolling body rolling groove 103 of the guide rail 101 to feed the lubricant thereto, as shown in FIG. 11. At least two sheets of sealing members 115, especially in this embodiment all of the sheets 115, differ in density from one another.

As the sealing members 115 sealing the axial ends of the slider 102 are formed from a porous felt material, the mode of the invention under description makes it possible to remove finely divided foreign matter and dust effectively and lower a force of friction acting between the sealing members and the guide rail 101 to suppress the heat generated by their sliding friction and the sliding wear of their lips and thereby improve their sealing performance and realize an outstanding dust-proofing result.

As each sealing member 115 is composed of a plurality of sheets arranged axially of the slider 102 and differing in density from one another, the sealing members 115 are of relatively high strength and high density and can remove even foreign matter of high hardness effectively.

Moreover, the sealing members 115 containing the lubricant exhibit a lubricating result, as well as a dust-proofing result. Since a sealing member 115 of high density achieves a high lubricant feeding rate, while a sealing member 115 of lower density gives a lower lubricant feeding rate, it makes possible to achieve any lubricating performance depending on the use of the device by employing sealing members 115 of different density.

It is also adapted to combining the first aspect of the present invention with the second aspect of the present invention. That is, the linear guide bearing apparatus comprising the lubricant feeding member, which is housed in the casing integrally formed with the pressing member and has plurality of the sealing members made of the porous felt material arranged in the axial direction of the slider and at least two of the sealing members differ in their density.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A linear guide bearing apparatus, comprising:
   a guide rail having an axially extending rolling body rolling groove;
   a slider having a rolling body rolling groove facing the rolling body rolling groove of the guide rail and mounted about the guide rail axially movably relative to the guide rail by rolling of pluralities of rolling bodies disposed between the rolling body rolling grooves;
   a lubricant feeding member made of a porous material which contains a lubricant, and feeding the lubricant to the rolling body rolling groove of the guide rail;
   a pressing member fined to an upper portion of the lubricant feeding member to exert pressure on the lubricant feeding member outwardly along a width direction of the slider so as to press a sliding contacting portion of the lubricant feeding member to the rolling body rolling groove of the guide rail, wherein the pressing member is substantially ring shape; and
   a casing formed integrally with the pressing member and housing the lubricant feeding member therein.

2. The linear guide bearing apparatus as set forth in claim 1, wherein the lubricant feeding member including pluralities of sealing members, which are made of porous felt material and arranged in an axial direction of the slider, and
   at least two sealing member differ in density from each other.

3. The linear guide bearing apparatus as set forth in claim 1, wherein the casing has a pressing portion formed on an inner surface thereof so as to press the sliding contacting portion to the rolling body rolling groove of the slider.

4. The linear guide bearing apparatus as set forth in claim 3, wherein
   the pressing portion is formed in substantially flat shape.

5. The linear guide bearing apparatus as set forth in claim 3, wherein the pressing portion is in substantially arc shape.

6. The linear guide bearing apparatus as set forth in claim 3, wherein the pressing portion protrudes from the casing to the lubricant feeding member while a width of the pressing portion reduces toward to a protruding direction.

7. The linear guide bearing apparatus as set forth in claim 3, wherein the pressing portion is plate spring.

8. A linear guide bearing apparatus, comprising:
   a guide rail having an axially extending rolling body rolling groove;
   a slider having a rolling body rolling groove facing the rolling body rolling groove of the guide rail and mounted about the guide rail axially movably relative to the guide rail by rolling of pluralities of rolling bodies disposed between the rolling body rolling grooves; and
   pluralities of sealing members attached to each axial end of the slider and making sliding contact with the guide rail to seal the axial end of the slider,
   wherein the plurality of the sealing members, which are made of porous felt material, are arranged in an axial direction of the slider, and
   at least two sealing member differ in density from each other.

9. The linear guide bearing apparatus as set forth in claim 8, wherein the sealing member is impregnated with a lubricant.

10. A linear guide bearing apparatus comprising:
    a guide rail having an axially extending rolling body rolling groove;
    a slider having a rolling body rolling groove facing the rolling body rolling groove of the guide rail and mounted about the guide rail axially movably relative to the guide rail by rolling of pluralities of rolling bodies disposed between the rolling body rolling grooves;

a lubricant feeding member made of a porous material which contains a lubricant, and feeding the lubricant to the rolling body rolling groove of the guide rail;

a pressing member fined to an upper portion of the lubricant feeding member to exert pressure on the lubricant feeding member outwardly along a width direction of the slider so as to press a sliding contacting portion of the lubricant feeding member to the rolling body rolling groove of the guide rail; and a casing formed integrally with the pressing member and housing the lubricant feeding member therein;

wherein the pressing member is substantially polygonal shape, and the pressing member protrudes from the casing to the slider while a width of the pressing member reduces toward to a protruding direction.

11. The linear guide bearing apparatus as set forth in claim 10, wherein the pressing member is substantially trapezoidal shape.

\* \* \* \* \*